(12) United States Patent
Ishitsuka

(10) Patent No.: US 9,298,305 B2
(45) Date of Patent: Mar. 29, 2016

(54) DISPLAY CONTROL APPARATUS AND METHOD

(71) Applicant: CANON KABUSHIKI KAISHA, Tokyo (JP)

(72) Inventor: Yuichiro Ishitsuka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 333 days.

(21) Appl. No.: 13/787,054

(22) Filed: Mar. 6, 2013

(65) Prior Publication Data

US 2013/0241896 A1 Sep. 19, 2013

(30) Foreign Application Priority Data

Mar. 19, 2012 (JP) ................. 2012-062705

(51) Int. Cl.
G06F 3/041 (2006.01)
G06F 3/0488 (2013.01)
G06F 9/44 (2006.01)

(52) U.S. Cl.
CPC .............. *G06F 3/0416* (2013.01); *G06F 3/041* (2013.01); *G06F 3/0488* (2013.01); *G06F 9/4443* (2013.01)

(58) Field of Classification Search
USPC ................................ 345/173, 178
See application file for complete search history.

(56) References Cited

U.S. PATENT DOCUMENTS

| 7,304,754 B1* | 12/2007 | Nakamura et al. ........... 358/1.15 |
| 7,970,240 B1* | 6/2011 | Chao et al. .................... 382/305 |
| 2003/0025676 A1 | 2/2003 | Cappendijk |
| 2003/0147097 A1* | 8/2003 | Kotani et al. ................ 358/1.18 |
| 2004/0130576 A1 | 7/2004 | Fujita et al. |
| 2005/0099400 A1* | 5/2005 | Lee ..................... G06F 3/04883 345/173 |
| 2010/0007613 A1* | 1/2010 | Costa ................... G06F 1/1601 345/173 |
| 2010/0214249 A1* | 8/2010 | Ikeda et al. .................. 345/173 |
| 2010/0333035 A1* | 12/2010 | Yoshida ....................... 715/835 |

FOREIGN PATENT DOCUMENTS

| CN | 1641557 A | 7/2005 |
| CN | 101377783 A | 3/2009 |
| JP | 06-314167 A | 11/1994 |
| JP | 2009-177322 A | 8/2009 |

OTHER PUBLICATIONS

Chinese Office Action issued in corresponding application No. 201310082089.6 on Sep. 14, 2015.

* cited by examiner

*Primary Examiner* — Jason Olson
*Assistant Examiner* — Sosina Abebe
(74) *Attorney, Agent, or Firm* — Carter, DeLuca, Farrell & Schmidt, LLP

(57) ABSTRACT

A display control apparatus comprises a setting unit which sets acceptance of a touch operation on a display unit to be valid or invalid; a display control unit which controls to display, when the acceptance of the touch operation is set to be invalid, option items and an icon superimposed over the option items, and when the acceptance of the touch operation is set to be valid, display the option items and the icon in an area where the icon is not superimposed over the option items; and a control unit which controls to select, when the acceptance of the touch operation is set to be valid, an option item displayed in accordance with a touch operation on the option item and select the icon displayed in accordance with a touch operation on the icon.

17 Claims, 8 Drawing Sheets

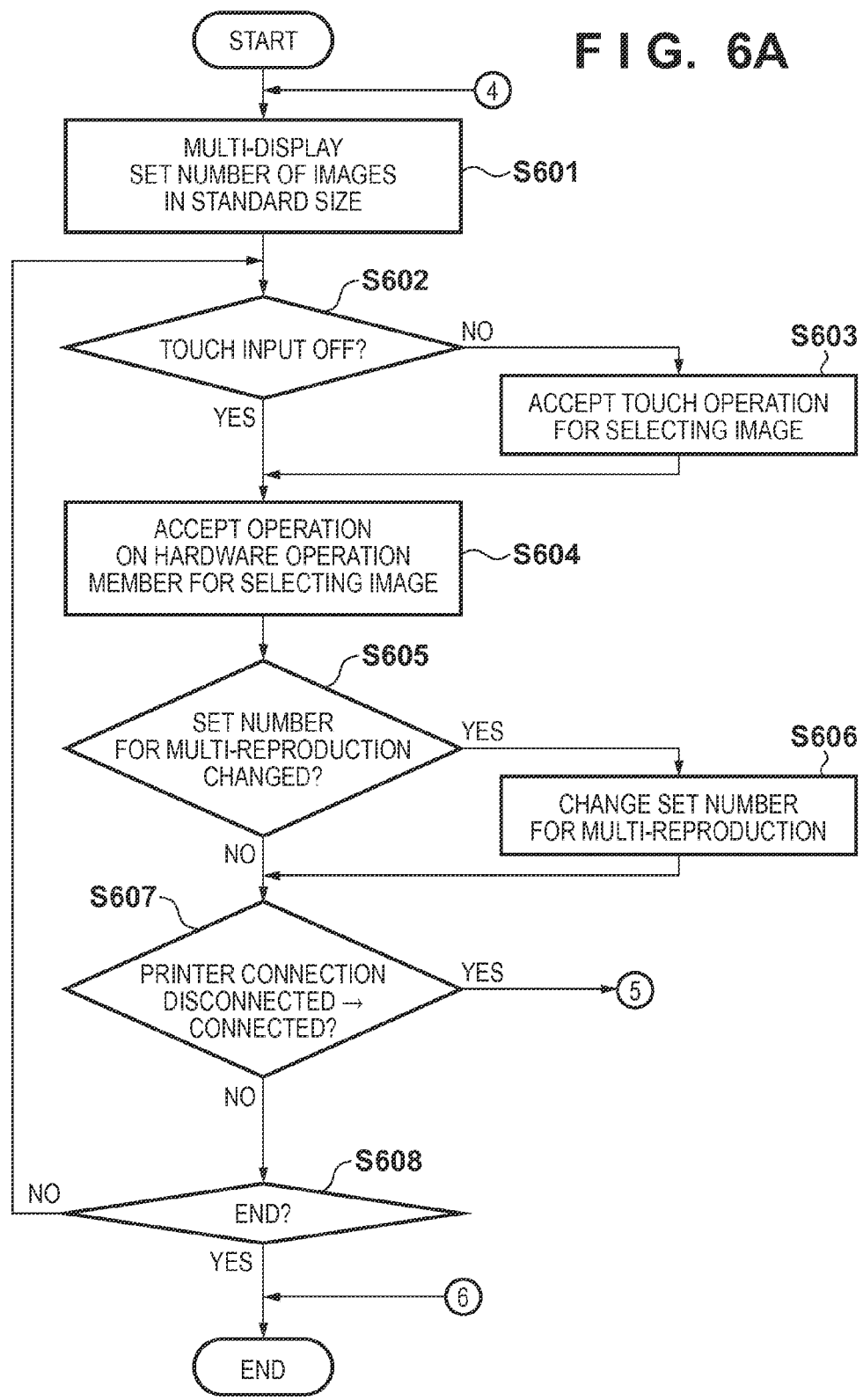

DISPLAY CONTROL APPARATUS AND METHOD

BACKGROUND OF THE INVENTION

1. Field of the Invention

The present invention relates to a display control apparatus and a display control method, and in particular to an apparatus on which touch operations can be performed.

2. Description of the Related Art

Conventionally, a multi-window display method is known whereby a plurality of images are displayed simultaneously on the same screen.

Japanese Patent Laid-Open No. 2009-177322 discloses a technique to, when displaying an icon for issuing an instruction with respect to images that are multi-displayed, display the icon in such a manner that said icon is superimposed over the images that are multi-displayed.

Meanwhile, an apparatus is known on which various types of operations can be performed by touch-operating the displayed images and icons using a touchscreen. Japanese Patent Laid-Open No. 06-314167 discloses a technique whereby, when parts of a plurality of items that respond to touch operations are superimposed over one another, an area of the superimposed parts is divided among the plurality of items so as to allow selection of any item.

However, in the case where the display technique disclosed in Japanese Patent Laid-Open No. 2009-177322 is used in an apparatus provided with a touchscreen, an icon that can be touch-operated is displayed superimposed over option items such as images. In this case, when an area where the icon is superimposed over an image is touched, it is not possible to accurately determine whether a user wishes to select the image or the icon. On the other hand, the conventional technique disclosed in Japanese Patent Laid-Open No. 06-314167 reduces the size of the parts that respond to touch operations when touchable option items are superimposed over one another. This makes it difficult for a user to touch a desired item and therefore lowers usability. However, if the option items are always displayed in a small size so they are not superimposed over one another, visibility of the option items would be needlessly lowered.

SUMMARY OF THE INVENTION

The present invention has been made in consideration of the aforementioned problems, and realizes a display control technique that makes it possible to ensure visibility of touchable option items without impairing usability when touching the option items.

In order to solve the aforementioned problems, the present invention provides a display control apparatus comprising: a setting unit configured to set acceptance of a touch operation on a display unit to be valid or invalid; a display control unit configured to perform control to display, when the acceptance of the touch operation is set to be invalid by the setting unit, option items on the display unit and display an icon superimposed over the option items, and when the acceptance of the touch operation is set to be valid by the setting unit, display the option items on the display unit and display the icon in an area where the icon is not superimposed over the option items; and a control unit configured to perform control to select, when the acceptance of the touch operation is set to be valid by the setting unit, an option item displayed on the display unit in accordance with a touch operation on the option item and select the icon displayed on the display unit in accordance with a touch operation on the icon.

In order to solve the aforementioned problems, the present invention provides a display control method of an apparatus having a display unit and a setting unit that sets acceptance of a touch operation on the display unit to be valid or invalid, the method comprising: a display control step of performing control to display, when the acceptance of the touch operation is set to be invalid by the setting unit, option items on the display unit and display an icon superimposed over the option items, and when the acceptance of the touch operation is set to be valid by the setting unit, display the option items on the display unit and display the icon in an area where the icon is not superimposed over the option items; and a control step of performing control to select, when the acceptance of the touch operation is set to be valid by the setting unit, an option item displayed on the display unit in accordance with a touch operation on the option item and select the icon displayed on the display unit in accordance with a touch operation on the icon.

According to the present invention, a display control technique can be realized that makes it possible to ensure visibility of touchable option items without impairing usability when touching the option items.

Further features of the present invention will become apparent from the following description of exemplary embodiments (with reference to the attached drawings).

BRIEF DESCRIPTION OF THE DRAWINGS

FIGS. 6A and 6B are flowcharts of the multi-image reproduction processing according to the Second Embodiment.

DESCRIPTION OF THE EMBODIMENTS

The following provides a detailed description of embodiments of the present invention with reference to the attached drawings.

First Embodiment

A description is now given of an embodiment in which a display control apparatus of the present invention is realized using an image capturing apparatus such as a digital camera.

<Apparatus Configuration>

First, a configuration and functions of a display control apparatus 100 according to an embodiment of the present invention are described below with reference to FIG. 1.

Figure 1:
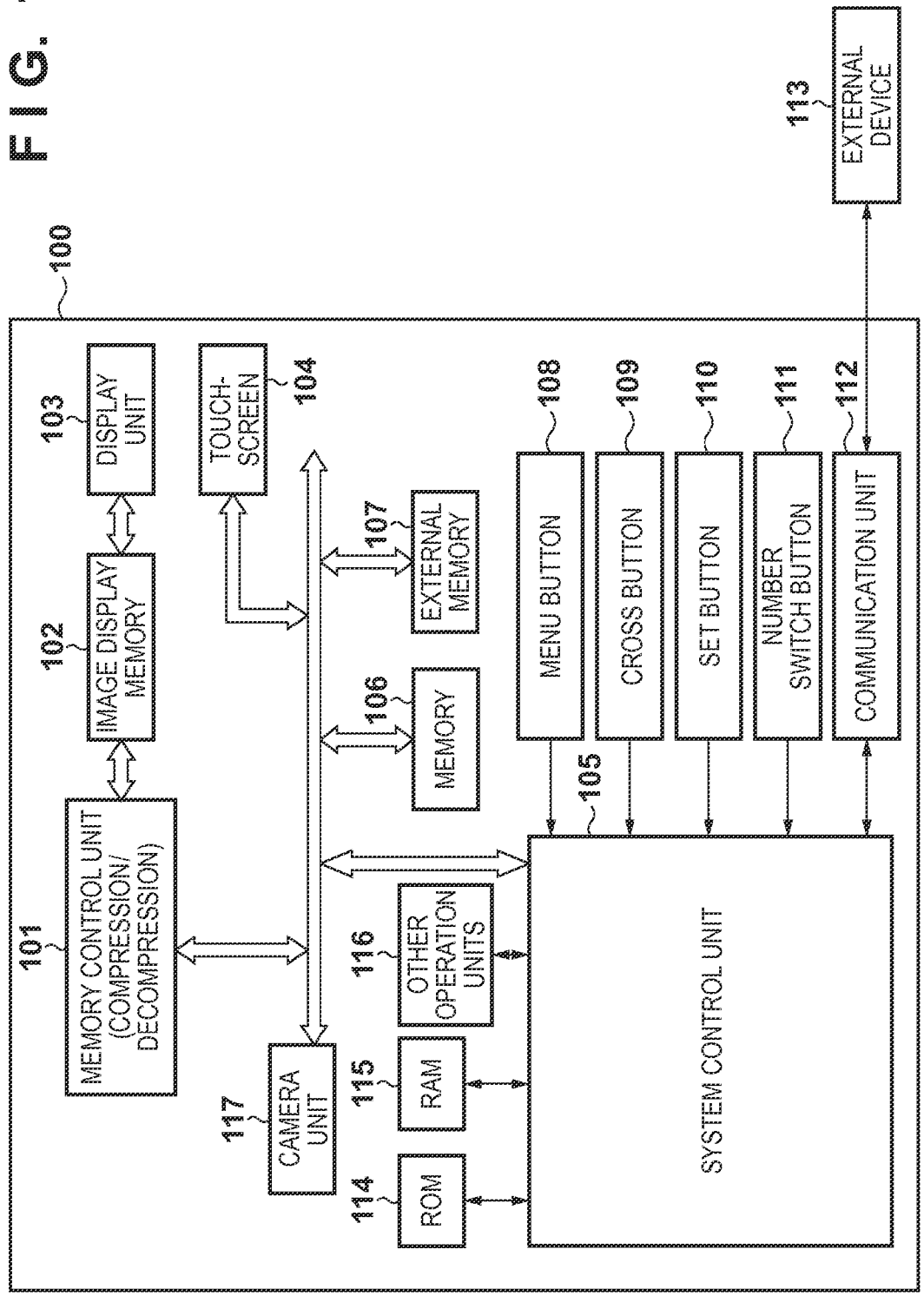
FIG. 1 is a block diagram showing a configuration of an image capturing apparatus according to an embodiment of the present invention.

Referring to FIG. 1, a memory control unit 101 is a memory control unit (record/reproduction unit) that compresses and decompresses image data and exchanges signals from an external memory 107. A memory 106 is used in developing images. The external memory 107 is an external recording medium such as a memory card in which images are stored. An image display memory 102 is a memory used as a buffer memory for displaying images. A display unit 103 is a display device such as an LCD that displays images and various types of information. A touchscreen 104 is a sensor that detects touch operations performed by a user. The touchscreen 104 is an input device that is formed in a planar fashion so as to overlie the display unit 103 and that outputs coordinate information corresponding to a position of a touch.

A system control unit 105 can detect the following operations on the touchscreen: The act of placing a finger or a stylus on the touchscreen (hereinafter referred to as touch-down); The state where a finger or a stylus is in contact with the touchscreen (hereinafter referred to as touch-on); The act of moving a finger or a stylus while it is in contact with the touchscreen (hereinafter referred to as move); The act of releasing contact between the touchscreen and a finger or a stylus (hereinafter referred to as touch-up); The state where nothing is in contact with the touchscreen (hereinafter referred to as touch-off). The above operations and the position coordinates at which a finger or a stylus touches the touchscreen are notified to the system control unit 105 via an internal bus. Based on the notified information, the system control unit 105 determines what kind of operation has been applied to the touchscreen. Regarding the move operation, the direction in which the finger or the stylus moves on the touchscreen can also be determined in units of vertical and horizontal components on the touchscreen based on changes in the position coordinates. When a touch-down operation, a move operation of a certain distance and a touch-up operation are successively performed on the touchscreen in this order, it is determined that a "stroke" has been performed. An operation of quickly performing the stroke is called a "flick". The flick is an operation whereby the finger is quickly moved by a certain distance while touching the touchscreen and then released from the touchscreen. In other words, the flick is an operation of quickly brushing or flicking the touchscreen with the finger. It is determined that the flick has been performed when the touch-up operation is detected immediately after detection of the move operation of a predetermined distance or longer at a predetermined speed or faster. On the other hand, it is determined that a "drag" has been performed when detecting the move operation of the predetermined distance or longer at a speed slower than the predetermined speed.

Note that the touchscreen may be of any type, such as a resistive type, a capacitive type, a surface acoustic wave type, an infrared type, an electromagnetic induction type, an image recognition type, and an optical sensor type. A menu button 108 is an operation button that is used to open a menu screen for performing various settings related to the display control apparatus 100. A cross button 109 is a hardware operation member that can be pressed to select up, down, left or right. The cross button 109 is used when, for example, selecting a desired item from among option items. A SET button 110 is a hardware operation member that can be pressed to, for example, issue an instruction for determining an item selected by operating the cross button 109 and the like. A number switch button 111 is a button for switching the number of items (images) that are displayed on one screen during multi-image reproduction. The number switch button 111 allows switching among 4-image display with 2 rows and 2 columns, 9-image display with 3 rows and 3 columns, 36-image display with 6 rows and 6 columns, and 100-image display with 10 rows and 10 columns. In the present embodiment, the number switch button 111 also functions as a scaling button for scaling up and down an image during single-display (one-image display).

A communication unit 112 is an interface such as a USB for communicating with an external device 113. Examples of the external device 113 include a printer and a personal computer. The communication unit 112 can detect connection of the external device 113 and notify the system control unit 105 of a detection signal. The communication unit 112 can also detect what the connected external device 113 is and a change from the state where the external device 113 is connected to the state where the external device 113 is disconnected (detached), and notify the system control unit 105 to that effect. The system control unit 105 is a system control circuit constituted by a CPU and the like. The system control unit 105 is connected to each block via a bus in such a manner that it can communicate with each block, and controls each block.

A ROM 114 is a nonvolatile recording medium having stored therein a program for executing various types of processing described later. A RAM 115 is a volatile recording medium used as a work memory for the system control unit 105. Other operation units 116 are various types of operation members for accepting operations from the user, and include a delete button (a button for issuing an instruction for deleting an image), a shutter button (a button for instructing a camera unit 117 to capture an image), and the like. The camera unit 117 is composed of an optical system including a zoom lens, a focus lens, a diaphragm, and the like, and of an image capturing unit including an image sensor, an A/D conversion circuit, and the like. With the use of the memory control unit 101 and the like, an image captured by the camera unit 117 is subjected to image processing and compression encoding and recorded in the external memory 107 as an image file.

<Description of Operations>

A description is now given of the operations of the display control apparatus according to the present embodiment.

In order to display image data through a user operation, compressed data stored in the external memory 107 is decompressed into normal data that is formed in correspondence with pixels of a captured image through the memory control unit 101, and the resultant data is transferred to the image display memory 102. As a result, the resultant data can be displayed on the display unit 103.

The image data may be displayed on the display unit 103 in the form of one-image reproduction (single display) whereby only one image is displayed, or in the form of multi-image reproduction whereby a plurality of images are displayed. For simplicity, only multi-image reproduction is discussed in the present embodiment. During multi-image reproduction, a desired image can be selected through movement of a cursor caused by pressing the up, down, left or right button of the cross button 109, or through movement of a cursor by touching the desired image.

Figure 2:
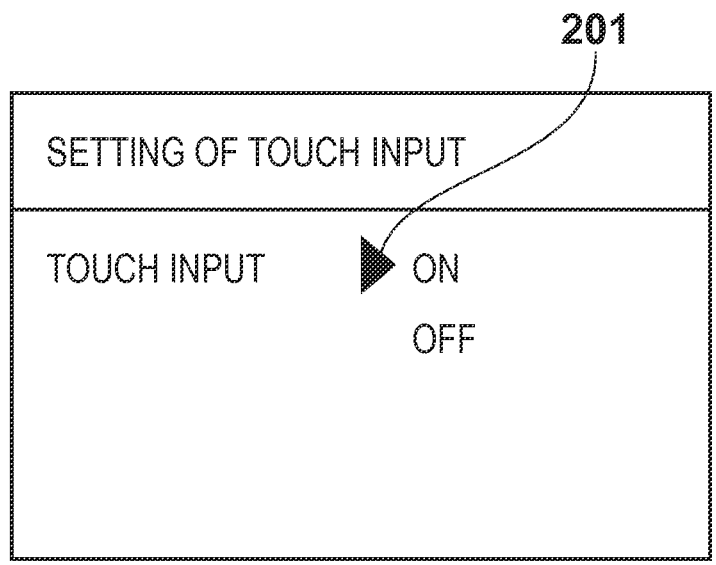
FIG. 2 shows an example of a screen for changing the setting of touch input.

FIG. 2 shows a touch input setting screen that is included in a menu displayed on the display unit 103. The display control apparatus 100 can be set whether or not to accept a touch operation on the touchscreen 104 in advance on a menu screen displayed in accordance with an operation on the menu button 108. When a menu item related to the setting of touch input is selected on the menu screen displayed in response to the pressing of the menu button 108, the touch input setting screen shown in FIG. 2 is displayed on the display unit 103. In this state, whether to turn on (validate) the touch input or to turn off (invalidate) the touch input can be selected by moving a cursor 201 displayed on the touch input setting screen using the cross button 109, and can be set by pressing the SET button 110. The resultant setting is stored in the ROM 114. When the touch input is on, touch operations and flick operations can be performed on the touchscreen 104 in addition to operations through the hardware operation members such as the cross button 109 and the SET button 110. When the touch input is off, touch input (touch operations) cannot be accepted; that is to say, only operations through hardware buttons such as the cross button 109 and the SET button 110 can be performed, and touch operations and flick operations cannot be performed on the touchscreen 104.

The display control apparatus 100 according to the present embodiment is an image capturing apparatus such as a digital camera including the camera unit 117. Therefore, turning off the touch input makes it possible to prevent erroneous operations caused by fingers accidentally touching the touchscreen 104 when holding the camera, or by the nose accidentally touching the touchscreen 104 when looking through the viewfinder.

Figure 3A:
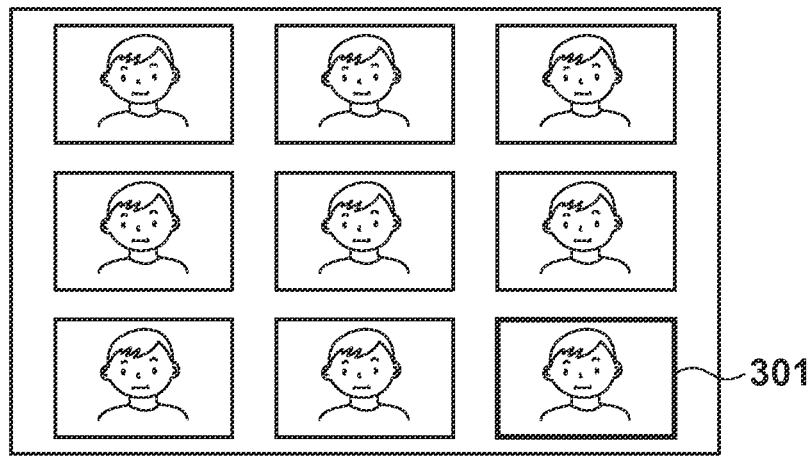
FIGS. 3A to 3C show examples of display according to multi-image reproduction processing according to the First Embodiment.
Figure 3B:
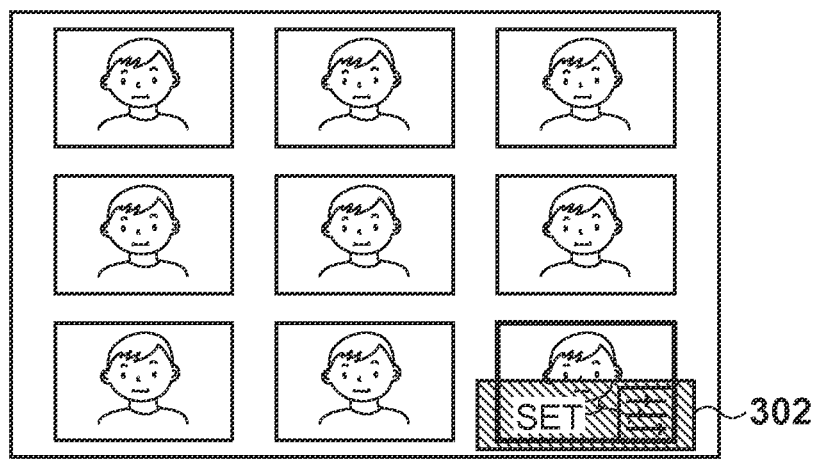
Figure 3C:
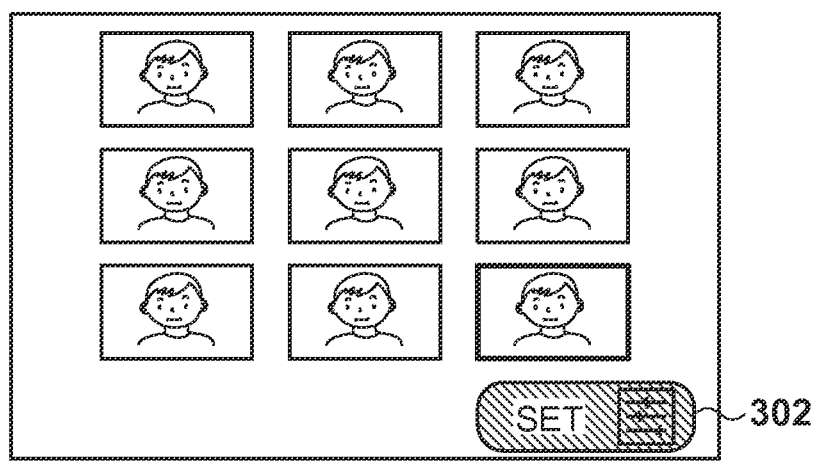

FIG. 3A shows an example of a screen displayed on the display unit 103 during normal multi-image reproduction. FIGS. 3A to 3C show examples of multi-image reproduction whereby nine images are simultaneously displayed in three rows and three columns. It is assumed that the display size of FIG. 3A is the standard size for multi-image reproduction of nine images. A selection cursor 301 indicates an image that is selected from among the images displayed in the form of multi-image reproduction. The selection cursor can be moved to another adjacent image in accordance with an operation on the cross button 109. When the touch input is set to "on", the selection cursor can be moved directly to a touched image.

FIG. 3B shows an example of display on the display unit 103 in the case where the touch input is set to "off". The state of FIG. 3B is the result of connecting a printer as the external device 113 in the state of FIG. 3A. Once the printer has been connected, a SET icon 302 is displayed in a semi-transmissive fashion as a key guide for accepting an instruction for determining an image to be printed using the printer, in such a manner that the SET icon 302 is superimposed over a part of the multi-displayed images. By looking at the display shown in FIG. 3B, the user acknowledges that he/she can issue an instruction for printing the image selected by the selection cursor 301 by touching the SET icon 302. In the case of FIG. 3B, as the touch input is set to "off", the touch input is not accepted. Therefore, in the case of FIG. 3B, even if a part where the SET icon 302 is superimposed over the multi-reproduced images is touched, no processing is performed. Furthermore, as the SET icon 302 is displayed in a semi-transmissive fashion, an image over which the SET icon 302 is superimposed is visible. Hence, there is no particular problem in displaying the SET icon 302 superimposed over the multi-reproduced images, and the multi-reproduced images are visible even without making the size of the multi-reproduced images smaller than the standard size.

FIG. 3C shows an example of display in the case where the touch input is set to "on". The state of FIG. 3C is the result of connecting a printer as the external device 113 in the state of FIG. 3A. Once the printer has been connected, nine images that had been multi-reproduced are each scaled down and displayed in a size smaller than the standard size (that is to say, the display size of the images shown in FIG. 3C is smaller than the display size of the images shown in FIG. 3A). In a vacant space (no-image area) that has been enlarged due to the scale-down, the SET icon is displayed as a key guide and a touch icon for accepting an instruction for determining an image to be printed using the printer, so that the SET icon is not superimposed over the images. By looking at the display shown in FIG. 3C, the user acknowledges that he/she can issue an instruction for printing the image selected by the selection cursor 301 by touching the SET icon 302. In the case of FIG. 3C, as the touch input is set to "on", the touch input is accepted. Therefore, in the case of FIG. 3C, the selection cursor can be moved to any of the multi-displayed images by touch-selecting that image, and an instruction for printing the image selected by the selection cursor 301 can be issued by touching the SET icon 302. Here, should the SET icon 302 be superimposed over the images when displayed, when a portion where the SET icon 302 is superimposed over the images is touched, it is difficult to determine whether the touch has been performed to issue an instruction for selecting an image or has been performed on the SET icon 302. However, by displaying the SET icon 302 and the images in such a manner that the SET icon 302 is not superimposed over the images as shown in FIG. 3C, a touch operation can be accepted from the user with clear distinction as to whether the touch operation has been performed with respect to the SET icon 302 or an image.

<Multi-Image Reproduction Processing>

Figure 4A:
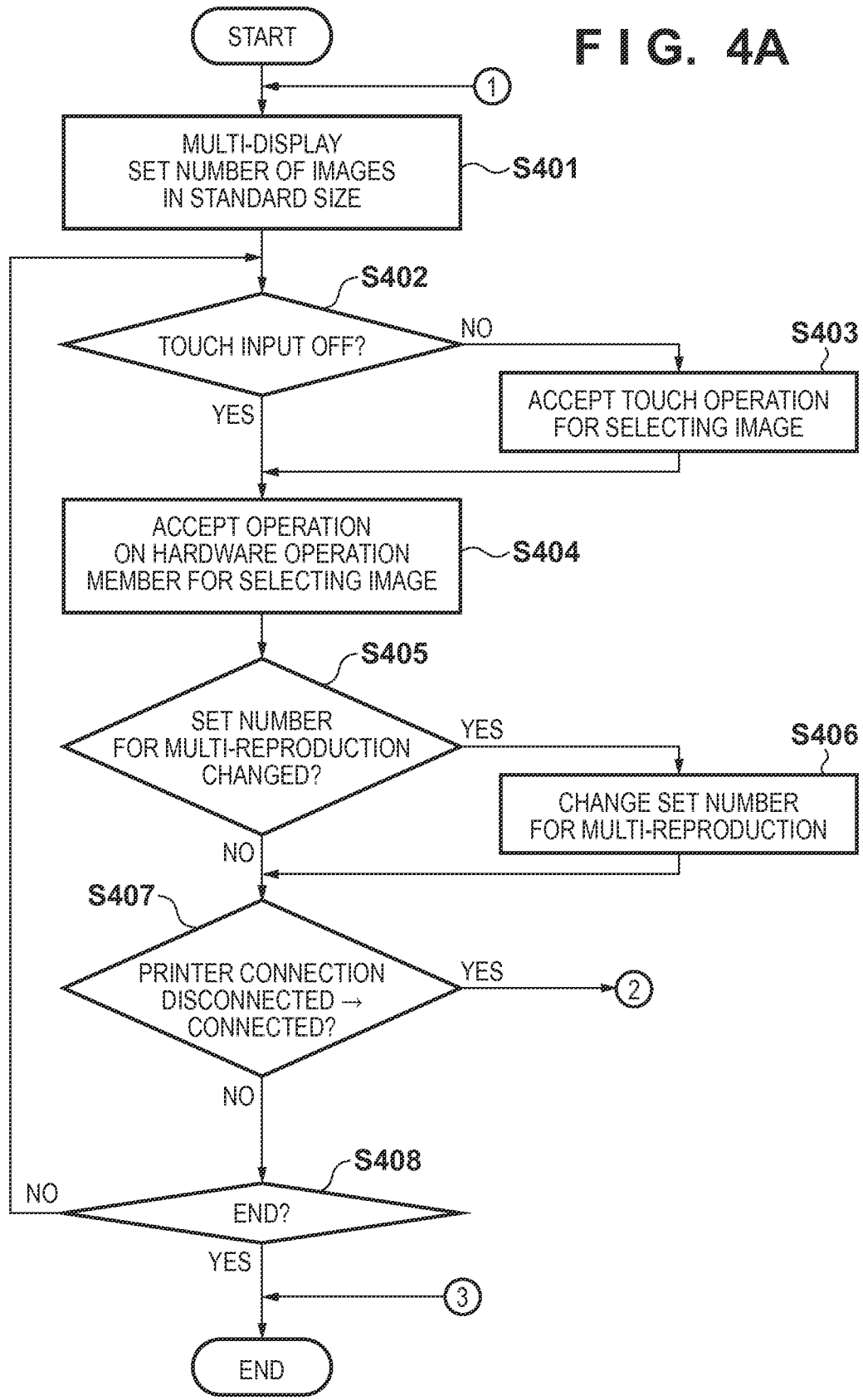
FIGS. 4A to 4B are flowcharts of the multi-image reproduction processing according to the First Embodiment.
Figure 4B:
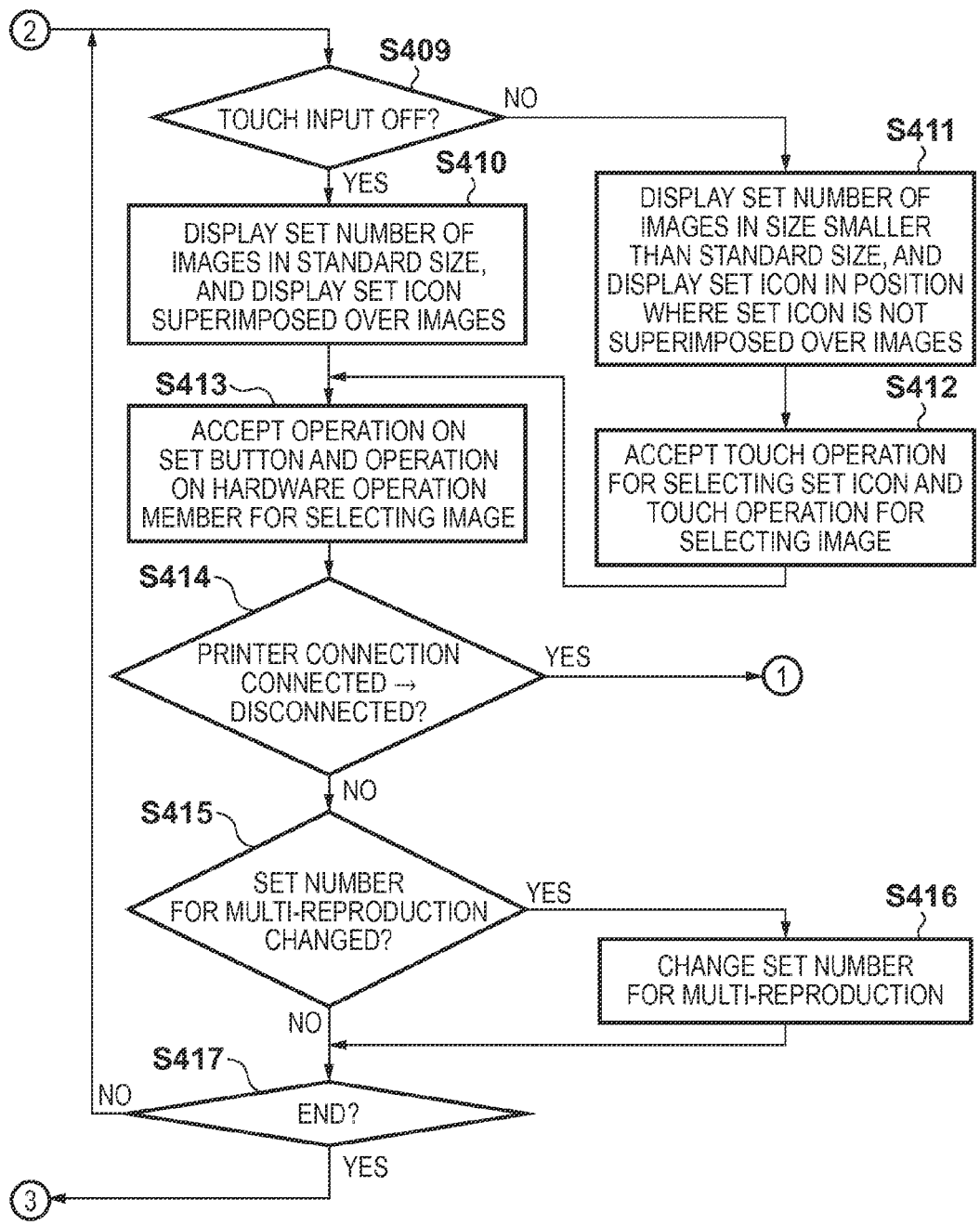

The following describes multi-image reproduction processing executed by the display control apparatus according to the present embodiment with reference to FIGS. 4A and 4B. This processing is realized by developing a program stored in the ROM 114 to the RAM 115 and by the system control unit 105 executing the developed program.

Referring to FIG. 4A, when the multi-image reproduction processing has been started, the system control unit 105 first performs default display whereby a set number of images are multi-displayed on the display unit 103 in the standard size in S401 (it is assumed here that the external device 113 is not connected). For example, when the set number is nine, the aforementioned display shown in FIG. 3A is performed.

In S402, the system control unit 105 determines whether or not the touch input is currently set to "off" by referring to the ROM 114. When the touch input is currently not set to "off", that is to say, when the touch input is currently set to "on", the processing moves to S403. On the other hand, when the touch input is currently set to "off", the processing moves to S404.

In S403, the system control unit 105 accepts a touch operation on the touchscreen 104. More specifically, the system control unit 105 determines whether or not a touch-down operation has been performed on the touchscreen 104, and when the touch-down operation has been performed, executes a process corresponding to the touch operation. When an image has been touched, the selection cursor moves to the touched image. When the touch-down operation has not been performed or when a process corresponding to a touch operation that follows the touch-down operation has been executed in S403, the processing moves to S404.

In S404, the system control unit 105 accepts an operation on a hardware operation member for switching a selected image out of the multi-reproduced images. More specifically, the system control unit 105 determines whether or not an operation has been performed on the cross button 109. When an operation has been performed on the cross button 109, the system control unit 105 moves the selection cursor from an image on which the selection cursor is currently located to an image that is adjacent in a direction corresponding to the operation. When no operation has been performed on the cross button 109 or when a process corresponding to the operation performed on the cross button 109 has been executed in S404, the processing moves to S405.

In S405, the system control unit 105 determines whether or not an operation for changing the set number for multi-image reproduction has been performed, that is to say, whether or not an operation has been performed on the number switch button 111. When an operation has been performed on the number switch button 111, the processing moves to S406. On the other hand, when no operation has been performed on the number switch button 111, the processing moves to S407.

In S406, in accordance with the operation performed on the number switch button 111, the system control unit 105 switches the number of images that are simultaneously displayed in the form of multi-image reproduction and updates the display accordingly. The number can be switched to 4, 9, 36, 100, and so on as has been described earlier. When an operation for further reducing the set number is performed on the number switch button 111 in the case where the set number is the minimum number for multi-image reproduction (four in the present example), the multi-image reproduction processing may be ended by switching to single-reproduction of an image on which the selection cursor is located. The set number for multi-image reproduction is stored in the RAM 115.

In S407, based on notification from the communication unit 112, the system control unit 105 determines whether or not a printer has been connected as the external device 113. When the system control unit 105 determines that the printer has been connected, the processing moves to S409 in FIG. 4B. On the other hand, when the system control unit 105 determines that the printer has not been connected, the processing moves to S408.

In S408, the system control unit 105 determines whether or not an event for ending the multi-image reproduction processing has occurred. Examples of the event for ending the multi-image reproduction processing include an operation for turning off the power, an operation for switching to a display mode other than multi-image reproduction, and an operation for switching to shooting mode. When the system control unit 105 determines that the event for ending the multi-image reproduction processing has occurred, it ends the multi-image reproduction processing. On the other hand, when the system control unit 105 determines that no such event has occurred, the processing returns to S402.

Referring to FIG. 4B, in S409, the system control unit 105 determines whether or not the touch input is currently set to "off" by referring to the ROM 114. When the touch input is currently set to "off", the processing moves to S410. On the other hand, when the touch input is currently not set to "off", that is to say, when the touch input is currently set to "on", the processing moves to S411.

In S410, the system control unit 105 displays a number of images equal to the current set number for multi-image reproduction in the standard size, and displays the SET icon superimposed over the images. For example, in the case where the set number is nine, when the connection of the printer has been detected in the state of FIG. 3A described above, the display shown in FIG. 3B is performed in S410.

In S411, the system control unit 105 displays a number of images equal to the current set number for multi-image reproduction in a size smaller than the standard size, and displays the SET icon in a vacant space, that is to say in a position where the SET icon is not superimposed over the images. For example, in the case where the set number is nine, when the connection of the printer has been detected in the state of FIG. 3A described above, the display shown in FIG. 3C is performed in S411.

In S412, the system control unit 105 accepts a touch operation on the touchscreen 104. More specifically, the system control unit 105 determines whether or not a touch-down operation has been performed on the touchscreen 104, and when the touch-down operation has been performed, executes a process corresponding to the touch operation. When an image has been touched, the selection cursor moves to the touched image. When the SET icon has been touched, an instruction for printing the image selected by the selection cursor 301 is issued. When a touch-down operation has not been performed or when a process corresponding to a touch operation that follows the touch-down operation has been executed in S412, the processing moves to S413.

In S413, the system control unit 105 accepts an operation on a hardware operation member for performing an operation on switching a selected image out of the multi-reproduced images, and accepts the pressing of the SET button 110. More specifically, the system control unit 105 determines whether or not an operation has been performed on the cross button 109. When an operation has been performed on the cross button 109, the system control unit 105 moves the selection cursor from an image on which the selection cursor is currently located to an image that is adjacent in a direction corresponding to the operation. The system control unit 105 also determines whether or not the SET button 110 has been pressed, and when the SET button 110 has been pressed, issues an instruction for printing the image on which the selection cursor is located. When an operation has been performed neither on the cross button 109 nor the SET button 110 or when a process corresponding to an operation on the cross button 109 or the SET button 110 has been executed in S404, the processing moves to S414.

In S414, based on notification from the communication unit 112, the system control unit 105 determines whether or not the printer that had been connected is detached. When the printer is detached, the processing moves to S401 in which the set number of images are displayed in the standard size and the SET icon is updated to a non-display state. For example, in the case where the set number is nine, the state where the SET icon 302 is displayed as in FIG. 3B or FIG. 3C is updated to the state where the SET icon 302 is not displayed as in FIG. 3A. When the printer is not detached, the processing moves to S415.

In S415, the system control unit 105 determines whether or not an operation for changing the set number for multi-image reproduction has been performed, that is to say, whether or not an operation has been performed on the number switch button 111. When an operation has been performed on the number switch button 111, the processing moves to S416. On the other hand, when no operation has been performed on the number switch button 111, the processing moves to S417.

In S416, in accordance with the operation performed on the number switch button 111, the system control unit 105 switches the number of images that are simultaneously displayed in the form of multi-image reproduction and updates the display accordingly, as in S406. Note that when the touch input is set to "on", the images are displayed in a size smaller than the standard size for the post-switch set number, and the SET icon is displayed in a vacant space.

In S417, the system control unit 105 determines whether or not an event for ending the multi-image reproduction processing has occurred. When the system control unit 105 determines that the event for ending the multi-image reproduction processing has occurred, it ends the multi-image reproduction processing. On the other hand, when the system control unit 105 determines that no such event has occurred, the processing returns to S409 and repeats the processes. Note that when no change has been made to the setting of touch input, the update of display in S410 and S411 is not performed.

As has been described above, when a printer is not connected, the present embodiment ensures usability associated with image selection and visibility of images regardless of the setting of touch input. When the printer is connected, if the touch input is off, the SET icon is displayed while maintaining usability associated with image selection and visibility of images. In this way, print operations can be performed without difficulty. Even if the touch input is on, as long as the images, albeit small, are displayed in at least a certain size, print operations/guides can be performed through touch operations while maintaining usability associated with image selection and visibility of the images.

Second Embodiment

The following describes a Second Embodiment of the present invention.

The First Embodiment has described an example in which, when a printer is connected in the case where the touch input is set to "on", a vacant space is created by scaling down the multi-reproduced images so as to display the SET icon and the images in such a manner that the SET icon is not superimposed over the images. However, according to the method of the First Embodiment, in the case where the set number for multi-image reproduction is large, the images are so small that they are hard to see. In view of this, in the Second Embodiment, in the case where the set number for multi-image reproduction is large, the images are not scaled down to a size smaller than the standard size even when the touch input is set to "on"; instead, a vacant space is created by reducing the number of displayed images to be smaller than the set number, and the SET icon is displayed in the vacant space so that the SET icon is not superimposed over the images.

FIGS. 5A to 5F show examples of display in multi-image reproduction processing according to the Second Embodiment. In the Second Embodiment, when the set number for multi-image reproduction is nine or less, the display is performed in a manner similar to the First Embodiment, and when the set number for multi-image reproduction is larger than nine, the SET icon is displayed together with a number of images fewer than the set number without making the images smaller than the standard size.

Figure 5A:
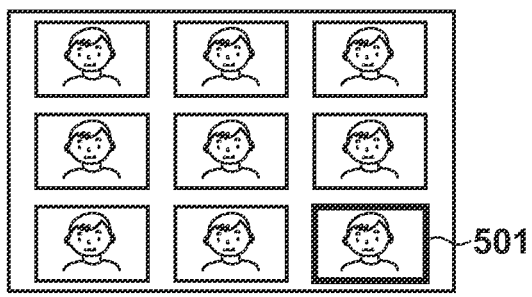
FIGS. 5A to 5F show examples of display according to multi-image reproduction processing according to the Second Embodiment.

FIG. 5A shows an example of display during multi-image reproduction with the set number being nine in the state where the printer is not connected. FIG. 5B shows an example of display during multi-image reproduction with the set number being nine in the state where the printer is connected and the touch input is set to "off". FIG. 5C shows an example of display during multi-image reproduction with the set number being nine in the state where the printer is connected and the touch input is set to "on". The display shown in FIGS. 5A to 5C is similar to the display shown in FIGS. 3A to 3C, and therefore a description thereof is omitted.

Figure 5D:
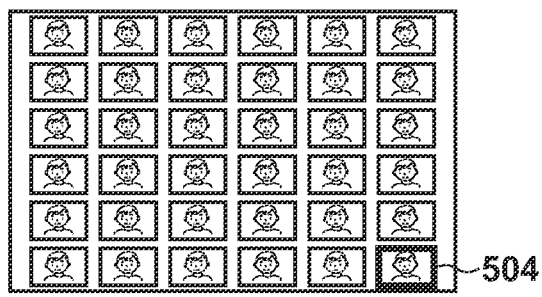
Figure 5B:
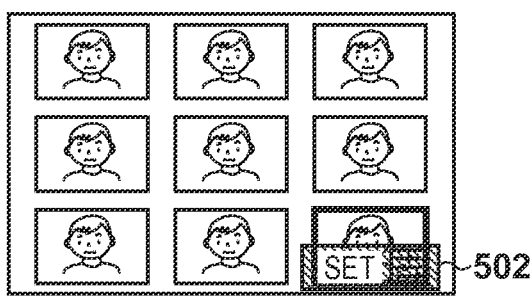

FIG. 5D shows an example of display on the display unit 103 during multi-image reproduction with the set number being 36 in the state where the printer is not connected. It is assumed that the display size of FIG. 5D is the standard size for 36-image display.

Figure 5E:
Figure 5C:
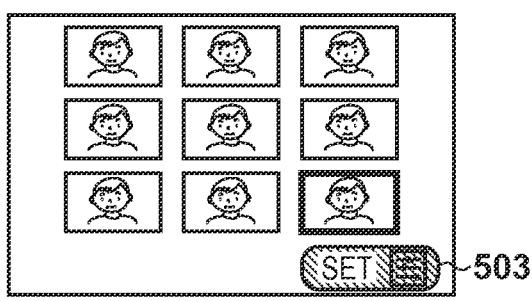

FIG. 5E shows an example of display on the display unit 103 during multi-image reproduction with the set number being 36 in the state where the printer is connected and the touch input is set to "off". The images are each displayed in the standard size for 36-image display, and a SET icon 505 is displayed superimposed over a part of the images as with the case of 9-image display.

Figure 5F:
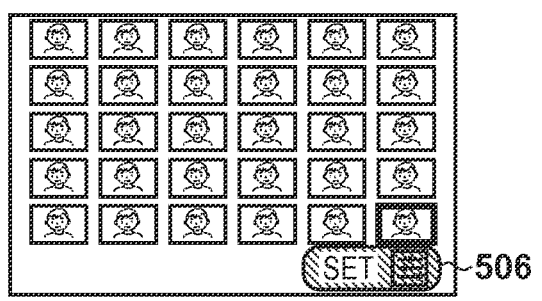

FIG. 5F shows an example of display on the display unit 103 during multi-image reproduction with the set number being 36 in the state where the printer is connected and the touch input is set to "on". Before the printer is connected, 36-image display is performed as shown in FIG. 5D. However, when the printer is connected, the number of displayed images is reduced by 6, and therefore 30-image display is performed in the standard size for 36-image display (that is to say, the display size is not changed regardless of the connection status) as shown in FIG. 5F. In 36-image display, even if the images are displayed in the standard size, they are already significantly small and hard to see. If the display size of the images is reduced in response to the connection of the printer, visibility of the images is further lowered, thus making it difficult to distinguish between the images. In view of this, in the Second Embodiment, in the case of 36-image display which presents more images than the case of 9-image display, the display shown in FIG. 5F is performed. That is to say, the number of displayed images is reduced by one row (i.e. 6 images) instead of making the size of the images smaller than the standard size, and the SET icon is displayed in the leftover area (vacant space) so that the SET icon is not superimposed over the images. This can be realized because, when the set number is large, reducing the number of displayed images to a certain extent has a low impact on list display. For example, in the case of 9-image display, reducing the number of displayed images by one row (i.e. 3 images) results in display of 6 images. In other words, the number of images that are simultaneously displayed is reduced to two-thirds the number. On the other hand, in the case of 36-image display, reducing the number of displayed images by one row (i.e. 6 images) results in display of 30 images. In other words, the number of images that are simultaneously displayed is reduced only to five-sixths the number, and therefore the impact of reducing the number of images is not as strong as the case of 9-image display.

<Multi-Image Reproduction Processing>

Figure 6B:
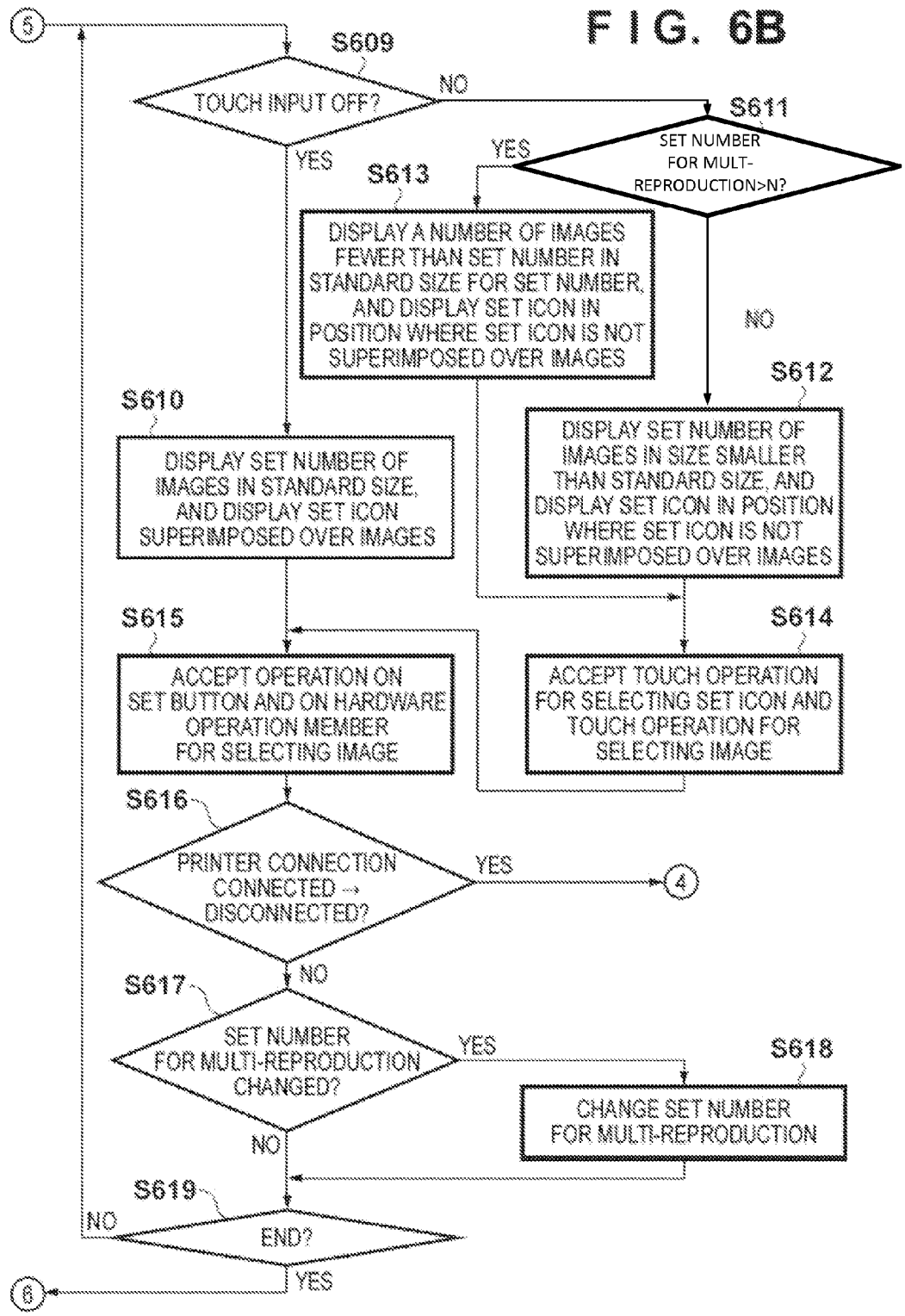

The following describes multi-image reproduction processing executed by the display control apparatus according to the Second Embodiment with reference to FIGS. 6A and 6B. This processing is realized by developing a program stored in the ROM 114 to the RAM 115 and by the system control unit 105 executing the developed program.

In FIGS. 6A and 6B, processes of S601 to S610 are similar to processes of S401 to S410 in FIGS. 4A and 4B that have been explained in the First Embodiment, and therefore a description thereof is omitted.

In S611, by referring to RAM 115, the system control unit 105 determines whether or not the current set number for multi-image reproduction exceeds N, namely a predetermined number (nine in the present embodiment). When the system control unit 105 determines that the current set number does not exceed N, the processing moves to S612. On the other hand, when the system control unit 105 determines that the current set number exceeds N, the processing moves to S613.

The process of S612 is similar to the process of S411 in FIG. 4B that has been explained in the First Embodiment, and therefore a description thereof is omitted.

In S613, the system control unit 105 displays a number of images fewer than the set number in the standard size for the set number. The system control unit 105 also displays the SET icon in a vacant space so that the SET icon is not superimposed over the images. For example, in the case where the set number is 36, the display shown in FIG. 5F is performed on the display unit 103.

Processes of S614 to S619 are similar to processes of S412 to S417 in FIG. 4B that have been explained in the First Embodiment, and therefore a description thereof is omitted. Note that when switching the number in S416, in the case where the touch input is set to "on", the display shown in FIG. 5C is performed if the set number is switched to 9, and the display shown in FIG. 5F is performed if the set number is switched to 36.

In this way, in addition to achieving the effects of the First Embodiment, it is possible to prevent the situation where visibility is impaired due to the displayed images being too small, even when the number of displayed images is large.

Moreover, the SET icon can be touch-operated while maintaining usability associated with image selection and visibility of the images.

In the present embodiment, when displaying the reduced number of images, if an image selected from among the displayed list of images is not in a non-display position, an unselected image is placed in non-display state. On the other hand, if the selected image is in a non-display position, the position of the selected image is changed to a position other than the non-display position, and an unselected image is placed in non-display state.

When the SET icon is placed in non-display state in FIGS. 5B, 5C, 5E and 5F, in the case where the touch input is set to "on" and the images are displayed in a second size that is smaller than a first size, the images are displayed in the first size. On the other hand, in the case where the touch input is set to "on" and the number of displayed images has been reduced to the predetermined number, a number of images equal to the original number are displayed.

The above embodiments have described an example in which the present invention is applied to a screen on which a plurality of images are multi-displayed. However, the present invention is not limited in this way. The present invention is applicable to anything with which, in the case where the touch operation is set to "on", a touch operation realizes display of display items (option items, equivalent to the aforementioned images) as options that can be selected using a hardware operation member, as well as display of a touch icon of another type (equivalent to the SET icon). In this case, when the touch operation is set to "off", the option items are displayed in a first size, and a touch icon is displayed superimposed over at least a part of the option items (note that a touch operation is not accepted in this case). On the other hand, when the touch operation is set to "on", the images are displayed in a second size that is smaller than the first size, and the touch icon is displayed in a vacant space created by reducing the size so that the touch icon is not superimposed over the images. When the number of images that are displayed at once exceeds the predetermined number, the number of images displayed in the same size is set to be smaller when the touch operation is set to "on" than when the touch operation is set to "off". The touch icon is displayed in a vacant space thus created so that the touch icon is not superimposed over the images.

Note that a single item of hardware may control the system control unit 105, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to an image capturing apparatus such as a digital camera, the present invention is not limited to this example. The present invention is applicable to, for example, a display control apparatus on which touch input can be performed. More specifically, the present invention is applicable to a personal computer, a PDA, a mobile telephone terminal, a mobile image viewer, a printer apparatus provided with a display, a digital photo frame, a music player, a game console, an electronic book reader, and the like.

Other Embodiments

Aspects of the present invention can also be realized by a computer of a system or apparatus (or devices such as a CPU or MPU) that reads out and executes a program stored on a memory device to perform the functions of the above-described embodiment(s), and by a method, the steps of which are performed by a computer of a system or apparatus by, for example, reading out and executing a program stored on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-062705, filed Mar. 19, 2012, which is hereby incorporated by reference herein in its entirety.

What is claimed is:

1. A display control apparatus comprising:
   a setting unit configured to set a touch operation to be valid or invalid, wherein in a case where the touch operation is set to be valid, a processing corresponding to the touch operation is performed in accordance with a touch operation on a display unit, and in a case where the touch operation is set to be invalid, a processing corresponding to the touch operation is not performed in accordance with a touch operation on a display unit;
   a display control unit configured to perform control to display, in a case where the touch operation is set to be invalid by the setting unit, option items on the display unit and display an icon superimposed over at least one of the option items, and in a case where the touch operation is set to be valid by the setting unit, display the option items on the display unit and display the icon in an area where the icon is not superimposed over any of the option items; and
   a control unit configured to perform control to select, in a case where the touch operation is set to be valid by the setting unit, an option item displayed on the display unit in accordance with a touch operation on the option item and select the icon displayed on the display unit in accordance with a touch operation on the icon.

2. The apparatus according to claim 1,
   wherein in a case where the touch operation is set to be invalid by the setting unit, the display control unit performs control to display the option items on the display unit in a first size and display the icon superimposed over the option items, and
   in a case where the touch operation is set to be valid by the setting unit, the display control unit performs control to display the option items on the display unit in a second size that is smaller than the first size and display the icon in an area where the icon is not superimposed over the option items.

3. The apparatus according to claim 2,
   wherein when displaying the icon in a state where the touch operation is set to be valid by the setting unit and the option items are displayed in the first size without displaying the icon, the display control unit performs control to change the size of the option items to the second size and display the option items in the second size.

4. The apparatus according to claim 2,
wherein when placing the icon in non-display state from a state where the option items are displayed in the second size, the display control unit performs control to change the size of the option items to the first size and display the option items in the first size.

5. The apparatus according to claim 3, further comprising a connection unit configured to connect to an external device,
wherein the display control unit performs control to display the icon when the external device has been connected via the connection unit.

6. The apparatus according to claim 3, further comprising a connection unit configured to connect to an external device,
wherein the display control unit performs control to place the icon in non-display state when the external device has been disconnected via the connection unit.

7. The apparatus according to claim 1,
wherein when displaying the icon superimposed over the option items, the display control unit performs control to display the icon in a semi-transmissive fashion.

8. The apparatus according to claim 1, further comprising:
a detection unit configured to detect the touch operation;
a selection unit configured to select one of the option items in accordance with an operation different from the touch operation; and
an acceptance unit configured to accept an instruction for causing execution of a function indicated by the icon in accordance with the operation different from the touch operation.

9. The apparatus according to claim 2,
wherein in the case where the touch operation is set to be invalid by the setting unit, when a first operation for increasing the number of option items displayed on the display unit is performed, the display control unit performs control to display a predetermined number of option items in a third size that is smaller than the second size, the predetermined number being larger than the number of the option items displayed before the first operation is performed, and
in the case where the touch operation is set to be valid by the setting unit, when the first operation is performed, the display control unit performs control to display a number of option items fewer than the predetermined number in the third size and display the icon in an area where the icon is not superimposed over the option items.

10. The apparatus according to claim 1,
wherein when displaying the icon in a state where the touch operation is set to be valid by the setting unit and a predetermined number of option items are displayed without displaying the icon on the display unit, the display control unit performs control to place at least one of the predetermined number of option items displayed in non-display state and display the icon in an area where the icon is not superimposed over the displayed option items.

11. The apparatus according to claim 10,
wherein when an item selected from among the option items is not in a non-display position, the display control unit places one of unselected items in non-display state, and when the item selected from among the option items is in the non-display position, the display control unit changes the position of the selected item to a position other than the non-display position and places one of unselected items in non-display state.

12. The apparatus according to claim 10, wherein when the icon is placed in non-display state, in the case where the touch operation is set to be valid and the number of the displayed option items has been reduced to be smaller than the predetermined number, the display control unit performs control to display the predetermined number of option items.

13. The apparatus according to claim 1,
wherein the display control apparatus is an image capturing apparatus including an image capturing unit, and
the option items are images captured by the image capturing unit.

14. A display control method of an apparatus having a display unit and a setting unit that sets a touch operation to be valid or invalid, wherein in a case where the touch operation is set to be valid, a processing corresponding to a touch operation is performed in accordance with a touch operation on a display unit, and in a case where the touch operation is set to be invalid, a processing corresponding to a touch operation is not performed in accordance with a touch operation on the display unit, the method comprising:
performing control to display, in a case where the touch operation is set to be invalid by the setting unit, option items on the display unit and display an icon superimposed over at least one of the option items, and in a case where the touch operation is set to be valid by the setting unit, display the option items on the display unit and display the icon in an area where the icon is not superimposed over any of the option items; and
performing control to select, in a case where the touch operation is set to be valid by the setting unit, an option item displayed on the display unit in accordance with a touch operation on the option item and select the icon displayed on the display unit in accordance with a touch operation on the icon.

15. A non-transitory computer-readable storage medium storing a program for causing a computer to execute a display control method of an apparatus having a display unit and a setting unit that sets a touch operation to be valid or invalid, wherein in a case where the touch operation is set to be valid, a processing corresponding to a touch operation is performed in accordance with a touch operation on a display unit, and in a case where the touch operation is set to be invalid, a processing corresponding to a touch operation is not performed in accordance with a touch operation on the display unit, the method comprising:
performing control to display, in a case where the touch operation is set to be invalid by the setting unit, option items on the display unit and display an icon superimposed over at least one of the option items, and in a case where the touch operation is set to be valid by the setting unit, display the option items on the display unit and display the icon in an area where the icon is not superimposed over any of the option items; and
performing control to select, in a case where the touch operation is set to be valid by the setting unit, an option item displayed on the display unit in accordance with a touch operation on the option item and select the icon displayed on the display unit in accordance with a touch operation on the icon.

16. A display control apparatus comprising:
a setting unit configured to set a touch operation to be valid or invalid, wherein in a case where the touch operation is set to be valid, a processing corresponding to a touch operation is performed in accordance with a touch operation on a display unit, and in a case where the touch operation is set to be invalid, a processing corresponding to a touch operation is not performed in accordance with a touch operation on a display unit;

a display control unit configured to perform control to display, in a case where the touch operation is set to be invalid by the setting unit, display option items on the display unit in a first size, and in a case where the touch operation is set to be valid by the setting unit, display the option items on the display unit in a second size that is smaller than the first size and display an icon in an area where the icon is not superimposed over any of the option items; and a control unit configured to perform control to select, in a case where the touch operation is set to be valid by the setting unit, an option item displayed on the display unit in accordance with a touch operation on the option item and select the icon displayed on the display unit in accordance with a touch operation on the icon.

17. The apparatus according to claim 16, wherein in a case where the touch operation is set to be invalid, the display control unit displays the option item with a first size in at least a part of a displayed area of the icon in a case where the touch operation is set to be valid.

\* \* \* \* \*